United States Patent [19]
Nicholson

[11] 4,236,554
[45] Dec. 2, 1980

[54] LAND CLEARING MACHINE

[75] Inventor: Thomas W. Nicholson, Bellevue, Wash.

[73] Assignee: Nicholson Manufacturing Company, Seattle, Wash.

[21] Appl. No.: 926,760

[22] Filed: Jul. 21, 1978

Related U.S. Application Data

[63] Continuation-in-part of Ser. No. 869,267, Jan. 13, 1978, abandoned.

[51] Int. Cl.³ .................. A01G 23/08; B02C 18/22
[52] U.S. Cl. .................. 144/34 R; 56/13.9; 56/119; 144/174; 144/309 AC; 144/326 R; 241/93; 241/101.7
[58] Field of Search ......... 241/101.7, 152 A, 241, 241/93; 56/13.6, 13.7, 13.8, 13.9, 98, 119; 144/2 N, 2 Z, 34 R, 309 AC, 326 R, 174

[56] References Cited
U.S. PATENT DOCUMENTS

| | | | |
|---|---|---|---|
| 3,375,646 | 4/1968 | Dion | 56/119 |
| 3,979,075 | 9/1976 | Heron | 241/101.7 |
| 3,996,980 | 12/1976 | Pallari | 56/13.9 |
| 4,019,308 | 4/1977 | Quick | 56/13.9 |

*Primary Examiner*—W. Donald Bray
*Attorney, Agent, or Firm*—Robert W. Beach; Ward Brown

[57] ABSTRACT

A rotating cutterhead projects forward from a tractor or other suitable vehicle and fells trees as the tractor is moved over land to be cleared. The tree-felling cutterhead rotates in a direction such that its leading face moves upward and then rearward to kick the butt of a felled or falling tree upward and then move it rearward onto an apron. The apron forms the bottom of a flared throat leading to a chipping cutterhead. An overhead live feed roll or a swinging feed rake positively feeds each tree rearward along the apron to the chipping cutterhead. Upright cutterheads may be carried at the sides of the flared throat to delimb a tree, or at least to crush the limbs inward, as the tree is moved rearward by the upper feed roll or rake.

25 Claims, 14 Drawing Figures

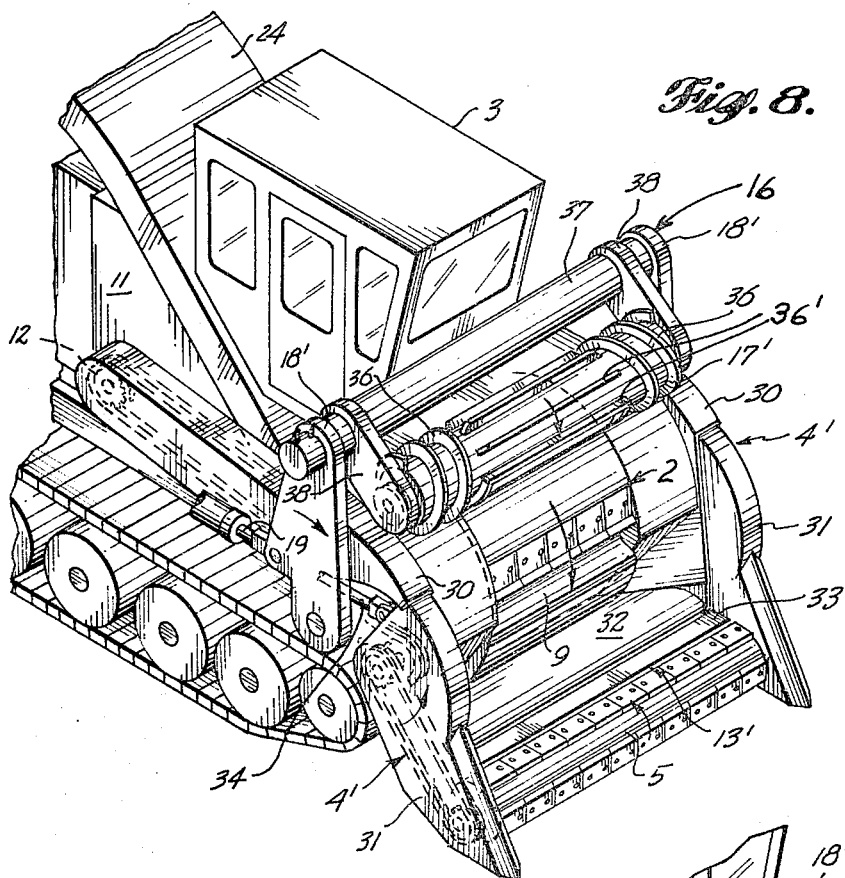
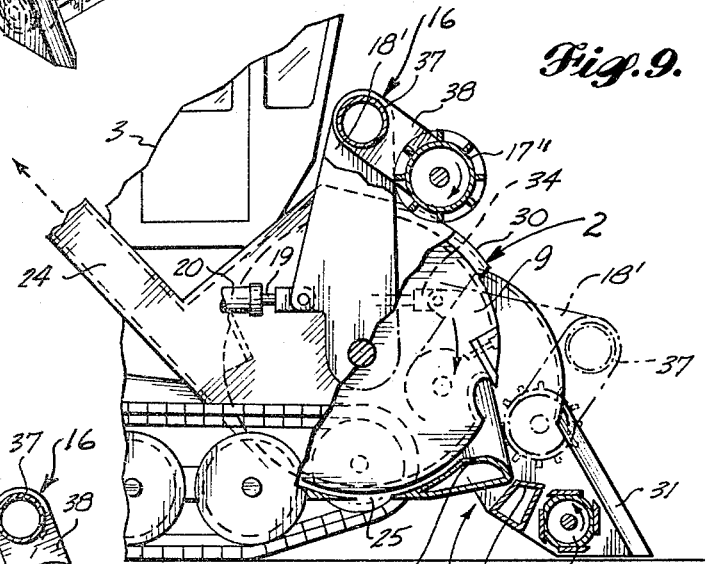
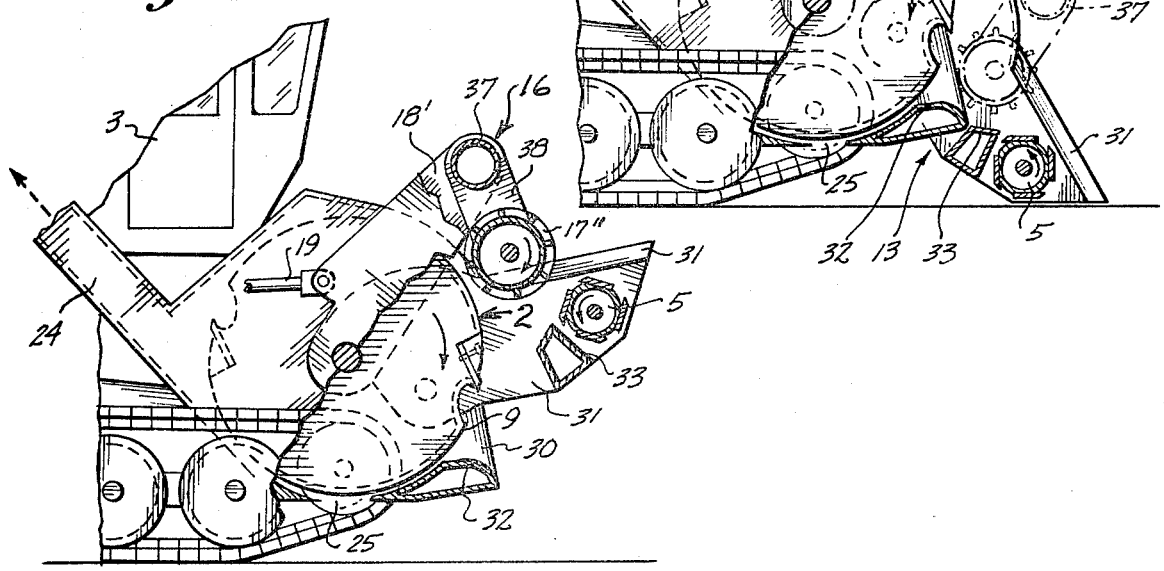

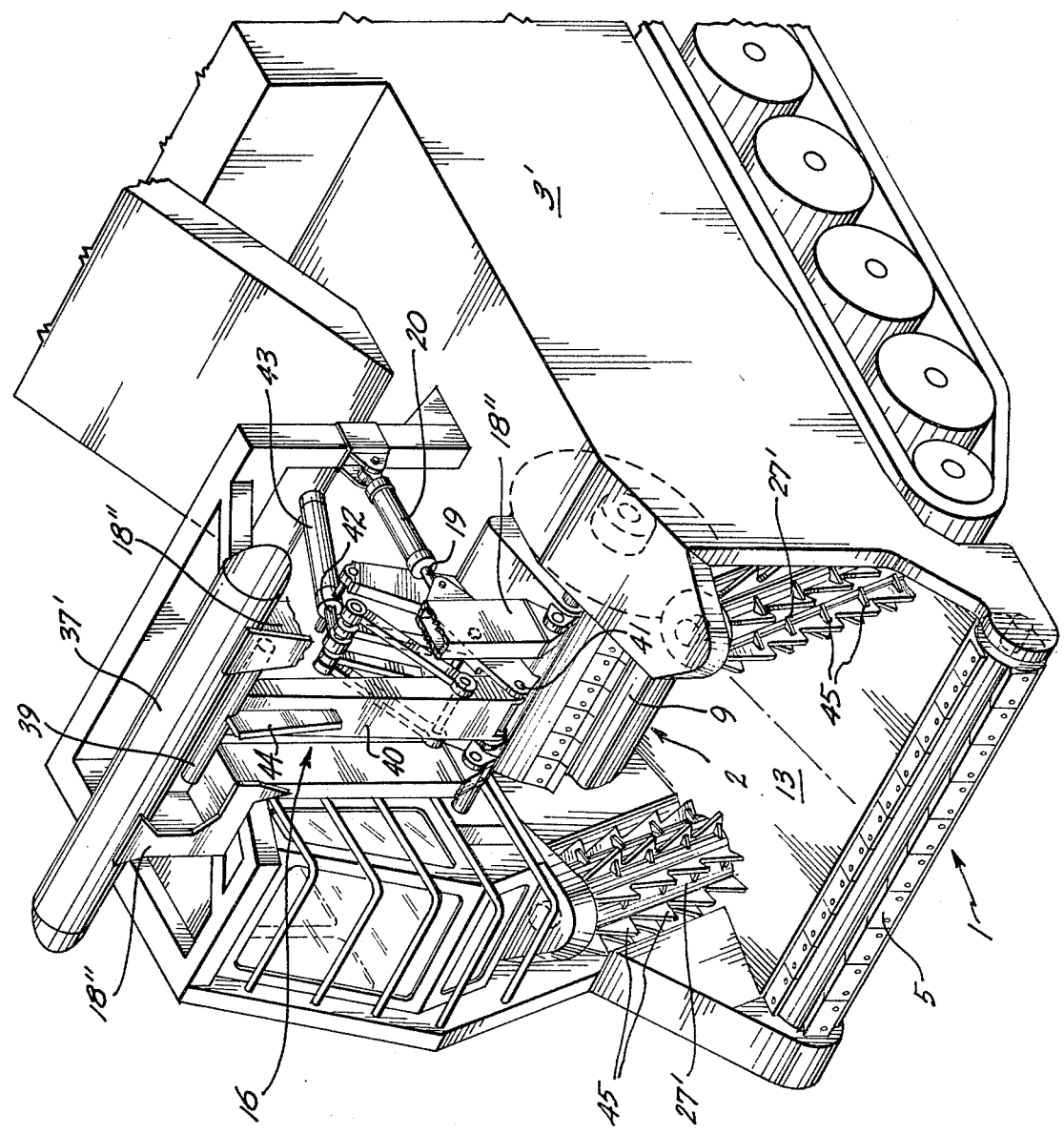

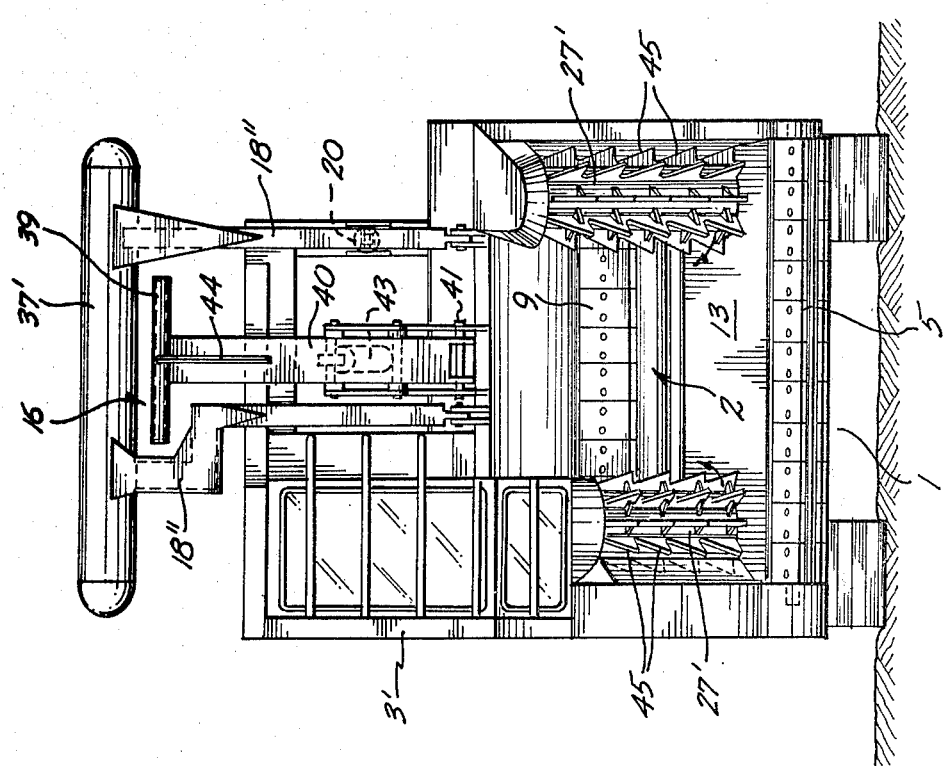

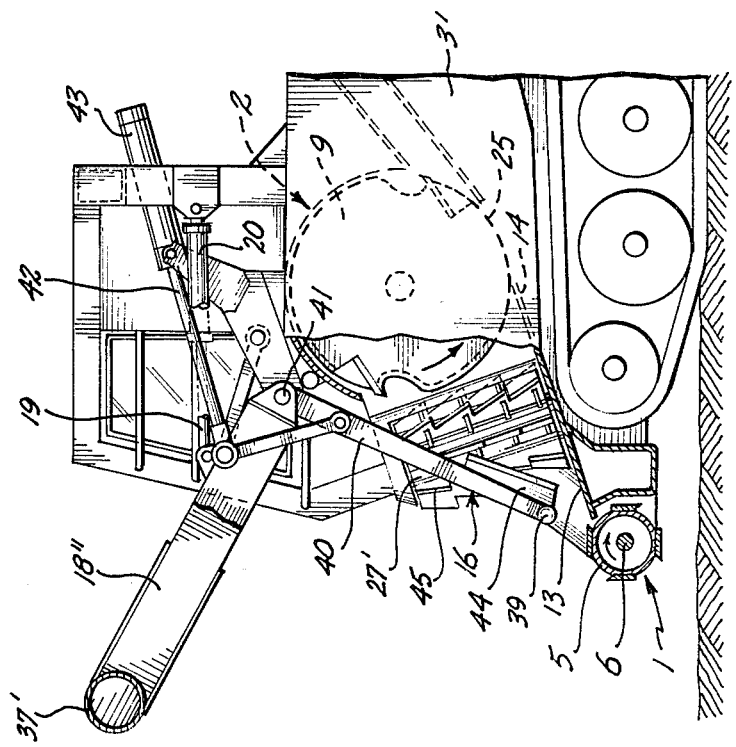
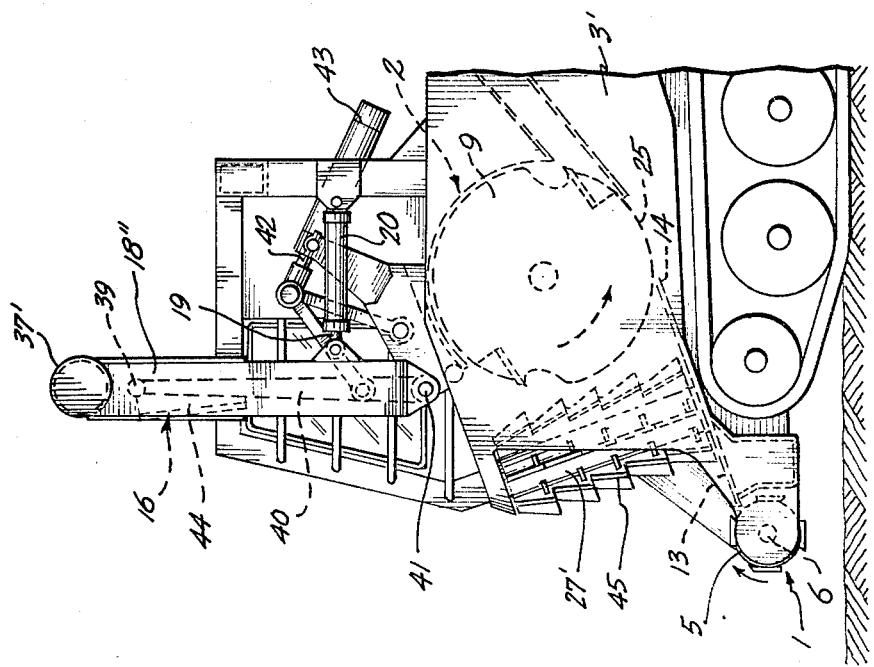

LAND CLEARING MACHINE

This application is a continuation-in-part of application Ser. No. 869,267, filed Jan. 13, 1978, for Relogging Machine now abandoned.

BACKGROUND OF THE INVENTION

1. Field of the Invention

The present invention relates to a mobile machine for felling and chipping trees.

2. Prior Art

According to the *McGraw-Hill Encyclopedia of Science and Technology,* Volume 7, page 651, tree-felling machines are known in which heavy-duty hydraulic-powered shears fell trees up to a stump diameter of 18 inches (45.72 cm). The shears may be mounted on or incorporated in wheeled or crawler type tractors. Such machines may both fell trees and buck them to pulpwood. The problem with such machines is that each time it is desired to fell a tree the tractor must be positioned precisely so that the tree is centered in the shears. Further, such machines do not clear land completely because no mechanism is provided for picking up slash.

U.S. Pat. No. 3,394,744 discloses a "Method and Apparatus for Felling and Treatment of Trees to Produce Wood Chips." This patent uses complicated mechanism for grasping a tree, for slicing through the tree with a rotating cutterhead and for feeding the tree downward against the cutterhead to cut the tree into chips. A problem with the method and apparatus of this patent is that the tree-grasping mechanism must be capable of supporting a severed tree upright and, consequently, only small trees may be felled and chipped by such method and apparatus.

U.S. Pat. No. 3,979,075 discloses a machine for felling and chipping "brushwood" using a pair of rotating cutterheads. One cutterhead fells trees and acts as a "reaction member" for the other cutterhead which chips the trees. However, the speed of rotation of one of the cutterheads must be constant relative to the speed of rotation of the other cutterhead. Consequently, complicated drive mechanism is required and stalling of one cutterhead effects stalling of the other cutterhead.

Other machines for shredding or chipping trees are disclosed in U.S. Pat. Nos. 3,545,692; 3,863,848; 3,955,765; and 4,057,192. These patents are concerned with processing felled trees rather than providing mechanism for felling trees.

SUMMARY OF THE INVENTION

It is an object of the present invention to provide a machine for clearing land by felling trees and brush, picking up slash and reducing them to chips.

Another object is to provide such a machine which will effect clean cuts for felling the trees and which will cut the felled trees into uniform chips rapidly.

An additional object is to provide such a machine in which trees to be felled and chipped are cut and handled in a controlled manner so that trees are felled in a desired direction and will not topple onto or out of the reach of the machine.

Still another object is to provide such a machine in which the branches of felled trees are compacted and-/or cut from such trees and then chipped.

It is also an object to provide such a machine which will clear logged land of slash.

A further object is to provide such a machine in a form that can be mounted on or incorporated in a conventional tractor.

Another object is to provide such a machine which will move substantially continuously, rather than intermittently, over land to be cleared.

The foregoing objects can be accomplished by mounting a tree-supporting apron on a tractor or other vehicle extending rearward from a feller to a chipper. In the preferred embodiment of the invention, the feller includes a cutterhead rotating about a horizontal axis in a direction such that its leading face moves upward and its upper face moves rearward to kick the butt of a felled or falling tree upward and rearward onto the apron. The apron forms the bottom of a throat leading to a chipping cutterhead and flared away from the chipper. An overhead live feed roll or a swinging feed rake positively feeds each tree rearward along the apron to the chipping cutterhead. The treefelling cutterhead is operable to pick up slash and kick it onto the apron to be compacted and fed rearward by the overhead feed roll or rake. The forward upright edges of the flared throat may be sharpened or may carry upright feed rolls and-/or cutterheads so that the limbs of trees fed by the overhead feeding mechanism are folded inward or cut off before they reach the chipping cutterhead. Separate drive mechanism is provided for each cutterhead so that each may be rotated at its optimum speed for performing its respective function and so that stalling of one cutterhead will not effect stalling of any other cutterhead.

BRIEF DESCRIPTION OF THE DRAWINGS

FIG. 8 is a fragmentary top perspective of another alternative form of land clearing machine in accordance with the present invention.

FIG. 9 and FIG. 10 are corresponding fragmentary side elevations of the land clearing machine shown in FIG. 8 with parts in different positions, parts being broken away and parts being shown in section.

FIG. 11 is a fragmentary top perspective of another alternative form of land clearing machines in accordance with the present invention.

FIG. 12 is a front elevation of the land clearing machine shown in FIG. 11; and

FIG. 13 and FIG. 14 are corresponding fragmentary side elevations of such land clearing machine with parts in different positions, parts being broken away and parts shown in section.

DETAILED DESCRIPTION

Figure 1:
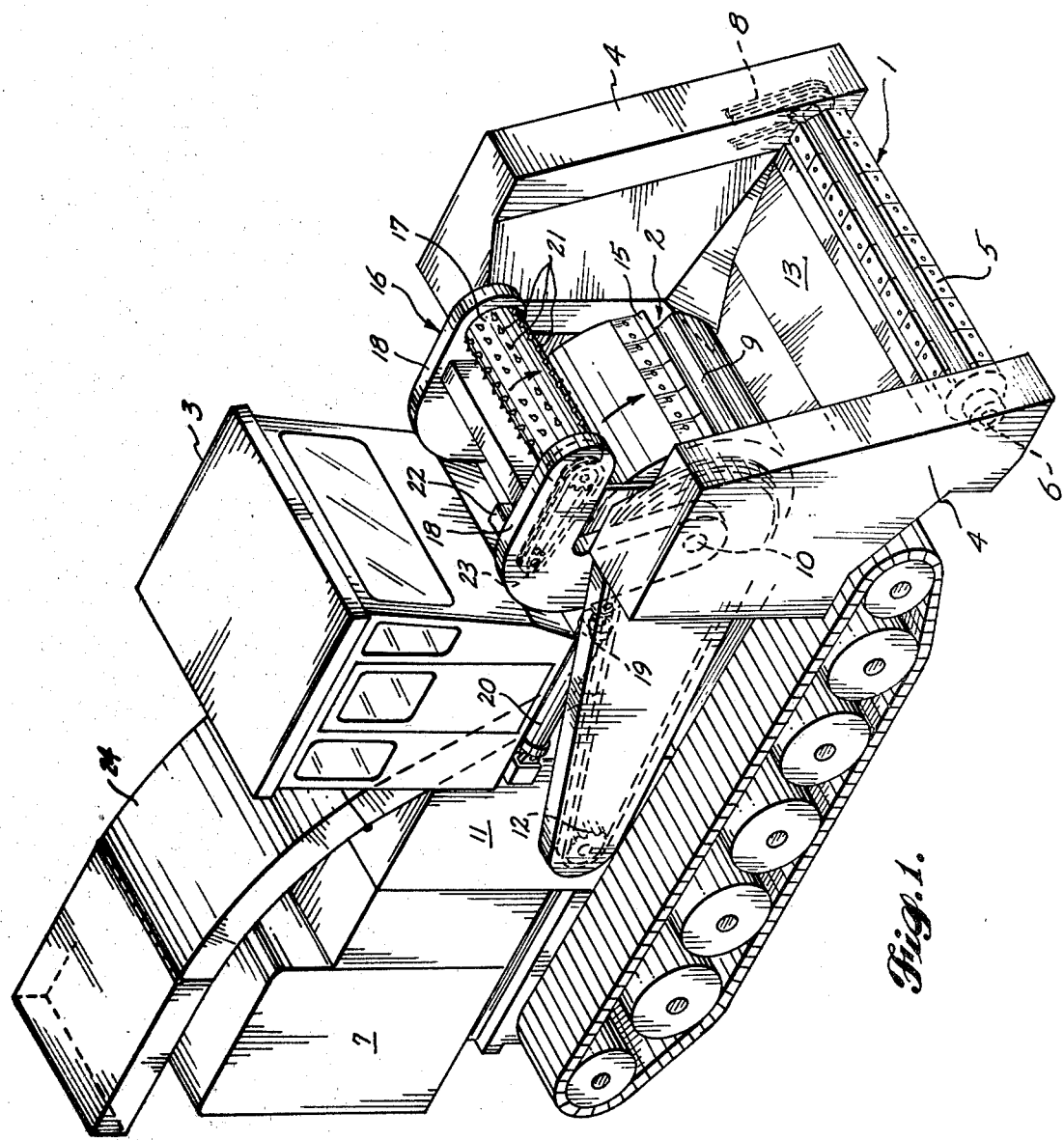
FIG. 1 is a top perspective of a land clearing machine in accordance with the present invention.

A machine in accordance with the present invention can be used in a prelogging operation in which small trees to be used for pulpwood or hog fuel, for example, are felled and removed, and large trees, that is trees of a size sufficient that they may be sawn into boards, dimension lumber and timbers, are left standing. Such machines can also be used in an integrated logging operation in which both large trees and small trees are felled and removed. However, such machine is particulaly useful in operations in which slash, brush and all trees left standing after the large trees of a stand have been felled and removed are salvaged. A machine in accordance with the present invention is designated as a land clearing machine or relogging machine because it is operable to fell trees and brush and pick up slash and chip such trees, brush and slash so that the land is substantially completely cleared.

In FIGS. 1 through 4, the feller 1 and chipper 2 are mounted on the front of a conventional crawler tractor 3 by stationary upright side casings 4, although the machine can be carried by any other suitable vehicle. The feller includes an elongated bladed rotary felling cutterhead 5 having its length extending transversely of the machine between the lower front portions of side casings 4. The felling cutterhead is rotatable about the generally horizontal axis of its central shaft 6 by conventional rotary power drive mechanism 7 and reduction chain gearing 8 shown in FIG. 2. The chipper mechanism includes a chipping cutterhead 9 spaced upward and rearward from the feller. The chipping cutterhead is rotatable about its generally horizontal central shaft 10 by conventional power drive mechanism 11 and chain gearing 12.

A stationary apron 13 extends laterally of the tractor between the inner sides of side casings 4 and longitudinally of the tractor between the top of the felling cutterhead and the bottom of the chipping cutterhead. The rearward edge of the apron forms an anvil 14 for the cutter bars 15 of the chipping cutterhead. Such apron forms the bottom of a throat flared from the chipper 2 toward the feller 1, the upright sides of such throat being formed by the inner sides of side casings 4.

Tree-feeding mechansim 16 is mounted on the tractor for elevational swinging toward and away from apron 13. The feeding mechanism includes an overhead live feed roll 17 extending between the outer end portions of side mounting arms 18 having inner end portions carried by the central shaft 10 of the chipping cutterhead. Arms 18 are swingable downward by extension of the plunger 19 of a hydraulic cylinder 20 into the broken line position shown in FIG. 2. Retraction of the plunger swings the mounting arms and feed roll to the solid line position of that figure. Feed roll 17 includes spikes or spines 21 and is driven by conventional drive mechanism such as a rotary hydraulic motor 22 and chain gearing 23.

Figure 2:
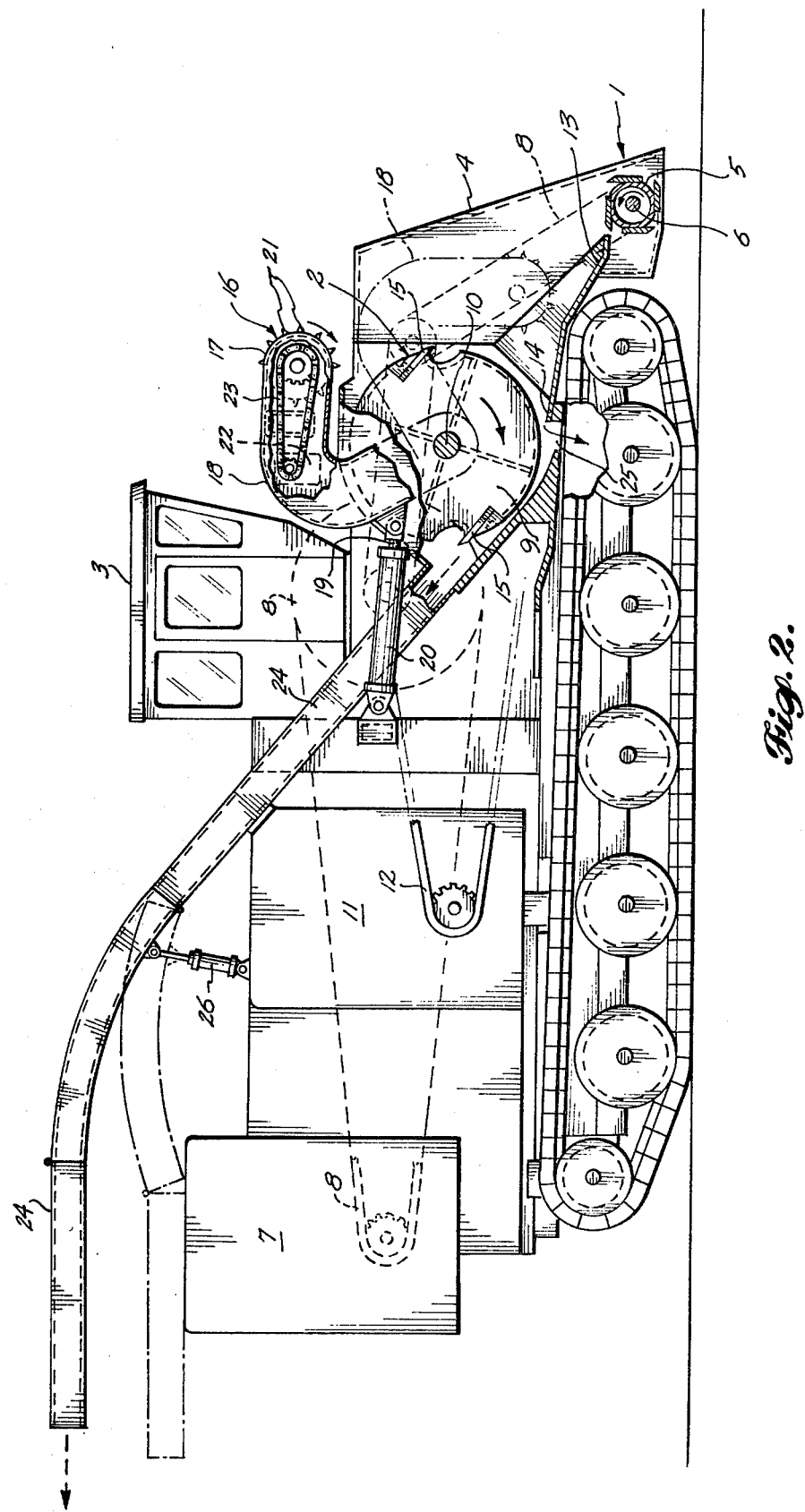
FIG. 2 is a side elevation of the land clearing machine of FIG. 1 with parts broken away and parts shown in section.
Figure 3:
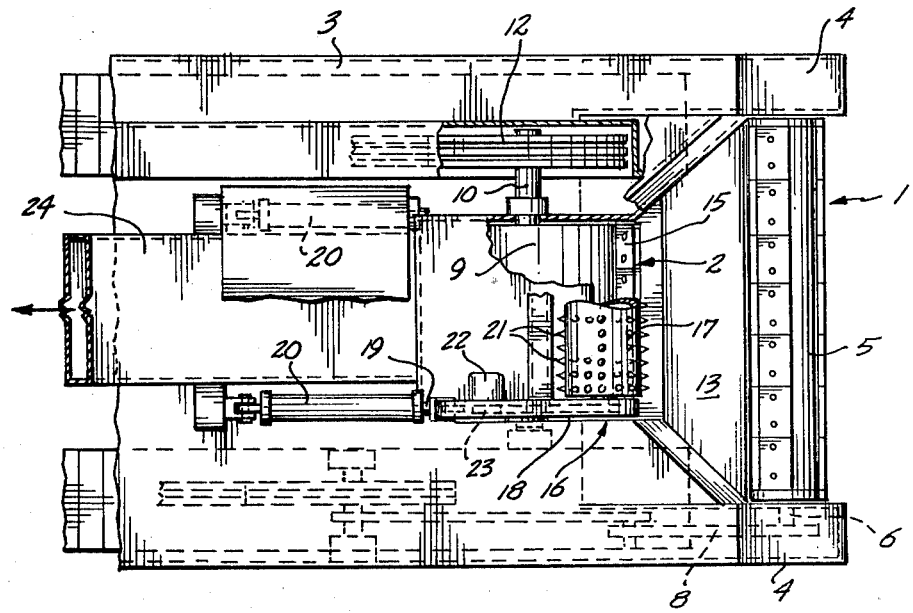
FIG. 3 is a top plan of the forward portion of such land clearing machine with parts broken away.
Figure 4:
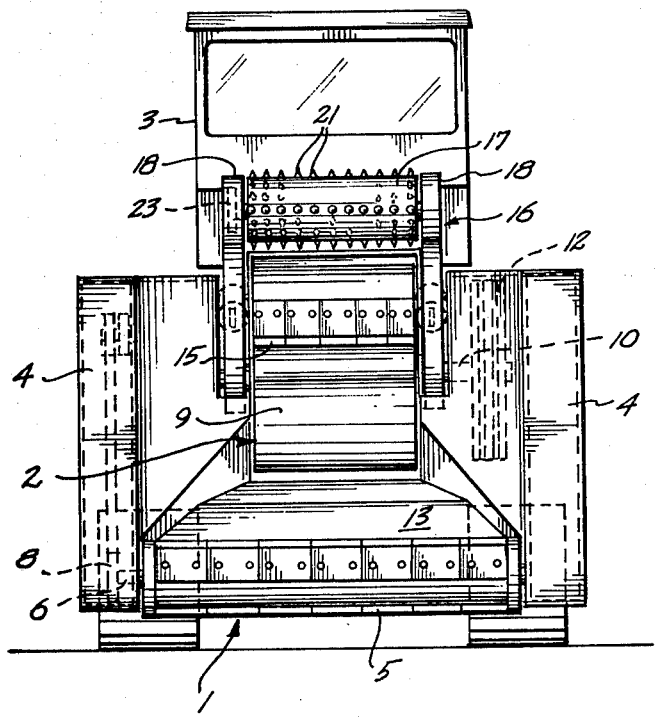
FIG. 4 is a front elevation of such land clearing machine.

In operation, as tractor 3 is moved in a forward direction over land to be relogged with its feed roll 17 in downward swung position, slash and standing trees are engaged by the felling cutterhead 5. Such cutterhead rotates in a direction such that its leading face moves upward and its upper face moves rearward so that engaged slash is kicked upward and rearward onto apron 13. Feed roll 17 rotates in the opposite direction to compact slash, and its spikes or spines 21 drag slash rearward over the apron and positively feed it to the rotating chipping cutterhead 9. The action of the chipping cutterhead cutter bars 15 and anvil 14 cuts the slash into chips and flings the chips into a chip discharge duct 24. Such duct may extend to a truck for hauling the chips from the relogged area. As best seen in FIG. 2, dirt and heavy debris fall downward through a discharge opening 25 located immediately rearward of anvil 14 and generally below the chipping cutterhead. As also seen in FIG. 2, the upper end of the chip discharge duct may be swung downward by a hydraulic cylinder 26 so that the duct does not project above the tractor when it is being transported to or from an area to be relogged.

When the feller 1 engages a standing tree, the cutterhead blades slice through the tree trunk and kick the butt of the felled or falling tree onto apron 13 causing the tree to fall forward away from the tractor. The butt of the tree is fed rearward along the apron toward chipper 2 by feed roll 17. If the tree has fallen at an angle to the centerline of the tractor, the tree butt will engage the inner side of one of the side casings 4 and will follow such side rearward to the chipping cutterhead 9. As with slash, the chipping cutterhead cutter bars 15 and the apron anvil 14 cooperate to cut the tree into chips. Such chips are flung rearward through chip discharge duct 24.

As the tree is fed rearward along apron 13, the tree branches are cut, crushed or broken and fed to the chipper. Downward extending branches are cut and kicked rearward by the felling cutterhead 5; upward extending branches are crushed and fed rearward by feed roll 17; and laterally extending branches engage one or the other of side casings 4, are broken as the tree is fed rearward and may be kicked onto the apron by the felling cutterhead to be engaged and fed to the chipping cutterhead by the feed roll.

Figure 5:
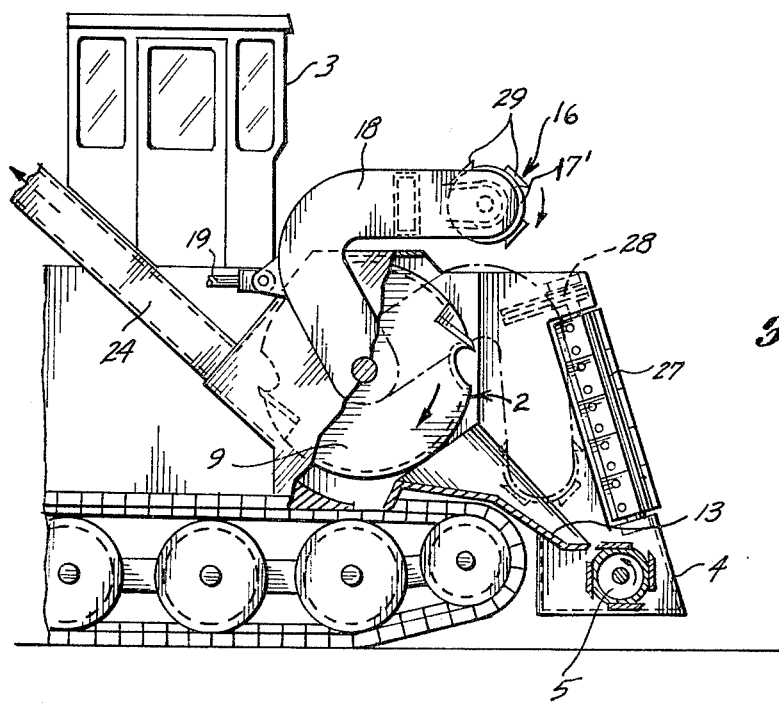
FIG. 5 is a side elevation of the forward portion of an alternative form of land clearing machine in accordance with the present invention.
Figure 6:
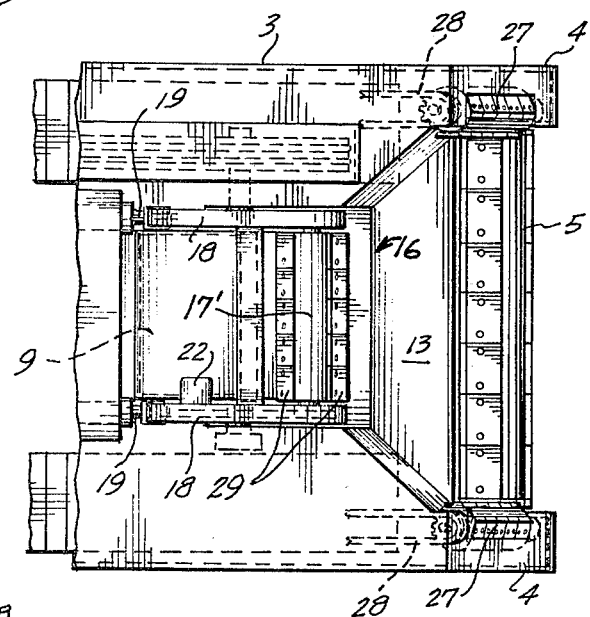
FIG. 6 is a top plan of the land clearing machine of FIG. 5 with parts broken away.
Figure 7:
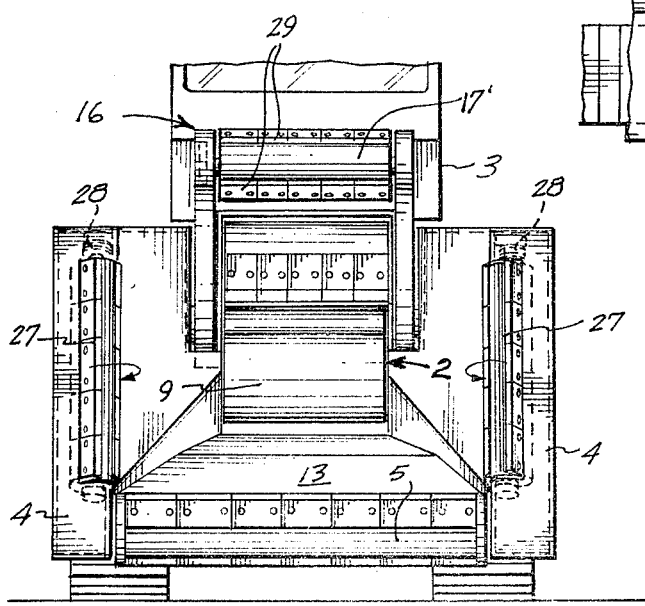
FIG. 7 is a front elevation of such land clearing machine with parts broken away.

In the modified embodiment shown in FIGS. 5, 6 and 7, a delimbing side cutterhead 27 is provided at the inner forward edge of each side casing 4. Each delimbing cutterhead is rotatable about a generally upright axis by its own drive mechanism, for example by a rotary hydraulic motor and chain gearing 28. The delimbing cutterheads are rotated in a direction such that their inner faces move rearward to feed branches toward the chipper 2 whether or not such branches are severed from the tree trunk by a side cutterhead. The side cutterheads also help to feed to the chipper trees which have fallen at an angle to the centerline of the machine and the general path of movement from the feller to the chipper. The embodiment of FIGS. 5, 6 and 7 is further modified in that the spines of overhead feed roll 17 are in the form of longitudinally extending cleats or cutting blades 29, rather than being in the form of the spikes 21 shown in FIGS. 1 through 4. In all other respects, the embodiment of FIGS. 5, 6 and 7 is identical to the embodiment of FIGS. 1 through 4.

In the embodiment shown in FIGS. 8, 9 and 10, the chipping cutterhead 9 is carried by upright side casings 4' between the tractor tracks at a much lower elevation than the chipping cutterhead of the previously described embodiments. Each side casing includes a stationary portion 30 carrying the chipping cutterhead and a lower, forwardly projecting, swingable portion 31 pivotally connected to a stationary portion 30. The felling cutterhead 5 is carried between the outer end portions of the swinging casing portions 31. The front edges of the casing swinging portions are sharpened to promote delimbing.

As best seen in FIGS. 9 and 10, apron 13' is formed by a stationary portion 32 extending between the casing stationary portions 30 and a swinging portion 33 extending between the casing swinging portions 31. Consequently, the rear apron portion is always stationary relative to the chipping cutterhead and the front apron portion is always stationary relative to the felling cutterhead. The rear side of the stationary apron portion forms an anvil for cooperating with the cutter bars of the chipping cutterhead. Extension and retraction of the plunger 34 of a hydraulic cylinder effects elevational swinging of the feller 1.

Rather than being spined throughout its length, feed roll 17' includes screw portions 36 toward its ends convoluted in opposite directions, respectively, for urging material engaged by the feed roll toward its center. The central portion of the feed roll has longitudinal cleats or blades similar to the cleats or blades of the embodiment of FIGS. 5, 6 and 7. The structure mounting the feed roll to its mounting arms 18' is slightly different than the mounting mechanism for the previously described embodiments. A pusher bar 37 extends between and rigidly connects the outer end portions of mounting arms 18'. Brackets 38 carrying feed roll 17' are connected to pusher bar 37 at acute angles to the mounting arms so that the pusher bar projects further outward from the chipping cutterhead than the feed roll. As in the other embodiments, the mounting arms are swingable about the chipping cutterhead axis by the plunger 19 of a hydraulic cylinder 20.

As the relogging machine approaches a standing tree, the feed roll mouting mechanism is swung upward to the solid line position of FIG. 9. As the felling cutterhead slices through the tree trunk, the feed roll mounting mechanism is swung downward toward the broken line position of FIG. 9 so that pusher bar 37 exerts a forward pressure on the tree and assures that the tree will fall forward away from the machine. In all other respects the operation of the embodiment shown in FIGS. 8, 9 and 10 is substantially identical to the operation of the previously described embodiments.

The embodiment of FIGS. 11, 12, 13 and 14 includes a pusher bar 37' mounted on a tractor 3' by mounting arms 18". Such mounting arms are swingable from the upward projecting position shown in FIGS. 11, 12 and 13 downward and forward to the position of FIG. 14 by extension of the plunger 19 of a hydraulic cylinder 20 so that the pusher bar exerts a forward pressure on a tree as it is being felled by the feller 1. However, unlike the embodiment of FIGS. 8, 9 and 10, rather than mounting a live feed roll directly on the pusher bar, tree-feeding mechanism 16 is in the form of an independent feed rake including a swingable shank 40 carrying on its swinging end a crossbar 39 separate from the pusher bar 37'. The shank 40 of the feed rake is pivotally mounted centrally of tractor 3' for swinging about the axis of a horizontal pivot 41 by extension of the plunger 42 of a hydraulic cylinder 43. As best seen in FIG. 14, the feed rake shank 40 is somewhat shorter than the distance between its pivot 41 and the felling cutterhead 5 so that crossbar 39 is swingable into the throat of the machine for dragging trees and slash rearward along apron 13 and thrusting such trees and slash into the chipper 2.

The feed rake can be swung up and down by the operator successively. As the feed rake is swung down, it compacts the material to be chipped and forces it toward the chipper. When the feed rake is swung up, it is raised from the material being fed so that such material is not pulled back away from the chipper. A feeder of this type is desirable because of its simplicity. Since the crossbar 39 is not rotatable, it is not necessary to provide any drive mechanism extending outward through or along shank 40 as is required to drive the feed roll 17 of the embodiment shown in FIG. 1 or the feed roll 17' of the embodiment shown in FIGS. 8, 9 and 10.

The outer portion of the feed rake shank 40 carries a bit or blade 44 having its length extending lengthwise of the shank and projecting beyond the side of the shank which faces downward when the feed rake is being swung counterclockwise from the position of FIG. 13 to the position of FIG. 14. If a branch or a small tree trunk, up to a diameter of about 15 cm, should become lodged rearward of the feller 1 in a position crosswise of the path of movement between the feller and the chipper 2, the plunger 42 can be reciprocated once or twice by the operator to swing the shank 40 from a raised position down about the axis of pivot 41 to drive the bit 44 into such an obstruction. The force of the blow or blows delivered by the bit to such transverse branch or trunk will break or shear its central portion and enable that portion to be dragged toward the chipper so that the portions at opposite sides of the break can swing toward each other. The broken branch or trunk can then be contracted sufficiently for movement through the converging passage of the casing to the chipper.

Like the embodiment of FIGS. 5, 6 and 7, in the embodiment of FIGS. 11 through 14 two cutterheads 27', each rotating about a generally upright axis, are mounted, respectively, at the opposite sides of apron 13. While the primary purpose of cutterheads 27 of the embodiment of FIGS. 5, 6 and 7 is to delimb a tree of its laterally projecting branches, the primary purpose of the upright cutterheads 27' of the embodiment of FIGS. 11 through 14 is to engage the branches of trees and slash and compact them while pushing them toward the chipper 2. Consequently, cutterheads 27' are positioned quite close to the chipping cutterhead 9, in fact, as shown in FIGS. 13 and 14, a substantial distance closer to such chipping cutterhead than the feller 1. In addition, rather than having longitudinal rows of sharpened delimbing cutterbars, cutterheads 27' have several longitudinal rows of sharpened teeth 45 for snagging or catching trees, slash and branches and pushing such trees, slash and branches rearward along apron 13 to the chipper.

As best seen in FIGS. 13 and 14, the rotating axes of side cutterheads 27' are generally perpendicular to the plane of apron 13 so that the force exerted on trees, slash and branches is parallel to the apron and they are slid easily along the apron. Also, it is preferred that each of the side cutterheads be reversible independently of the other cutterhead. If a tree or large branch lodges between the feller 1 and the side cutterheads with its length extending transversely of the path of movement from the feller to the chipper one or the other of the cutterheads can be reversed so that both of the cutterheads are rotating in the same direction to shift the tree lengthwise in one direction or the other until the butt of the tree is moved into the passage to the chipper. Alternatively, if the passage to the chipper becomes jammed, both side cutterheads can be reversed to pull material forward away from the chipper until the jam is cleared. Their original direction of rotation can then be restored so that again they will feed material to the chipper.

The operation of the embodiment of FIGS. 11 through 14 is generally similar to the operation of the previously described embodiments. As tractor 3' is moved over the ground, the tree-falling cutterhead 5 kicks slash upward and rearward onto apron 13. The feed rake can be swung downward to move the slash rearward until it is engaged by the side cutterheads 27', and positively fed to the chipper 2. When a standing tree is engaged by the felling cutterhead, pusher bar 37' is swung to exert a forward pressure on the tree as it is felled, assuring that the tree will not fall onto or out of the reach of the machine. The butt of such tree is kicked onto the apron by the felling cutterhead, whereupon the feed rake is swung down to thrust the tree rearward into engagement with one or the other or both of the side cutterheads for feeding the tree to the chipper.

In each embodiment of a relogging machine in accordance with the present invention, the chipping mechanism is located a substantial distance from the felling mechanism so that neither interferes with the operation of the other. In addition, separate drive mechanism is provided for each of the felling mechanism, chipping mechanism and feed mechanism so that each independently of the others and so that stalling of one mechanism will not effect stalling of any other mechanism. Further, the chipping mechanism operates similar to efficient known chippers in that an anvil is maintained stationary relative to a rotating cutterhead and, consequently, uniform and rapid chipping is effected. Other advantages of a relogging machine in accordance with the present invention are that the machine need not be positioned precisely relative to a tree to be felled and trees always are felled in the same general direction. Even trees felled at an angle to the machine are guided to the chipping mechanism. Thus, underbrush and small trees can be cleared from timber land to leave only large trees, or logged land or land with only scrub growth can be completely cleared by simply moving the machine continuously at a steady pace without interruption over a desired area.

I claim:

1. A land clearing machine for felling and chipping trees comprising:
   a vehicle;
   a tree-felling cutterhead carried by and projecting forward from said vehicle and rotatable about a generally horizontal axis extending transversely of said vehicle;
   a tree-chipping cutterhead carried by said vehicle a substantial distance rearward of said tree-falling cutterhead and rotatable about a generally horizontal axis extending transversely of said vehicle;
   a tree-supporting generally horizontal apron mounted on said vehicle and extending fore-and-aft between said tree-felling cutterhead and said tree-chipping cutterhead;
   tree-feeding means carried by said vehicle generally above said apron for feeding trees rearward along said apron from said tree-felling cutterhead to said tree-chipping cutterhead; and
   separate drive means for rotating said respective cutterheads about their axes independent of each other.

2. A land clearing machine for felling and chipping trees comprising:
   a vehicle;
   a cylindrical felling cutterhead carried by the forward portion of said vehicle and rotatable about a horizontal axis extending transversely of said vehicle;
   chipping means carried by said vehicle at a location spaced a substantial distance rearward from said felling cutterhead and rotatable about a horizontal axis extending transversely of said vehicle;
   generally horizontal tree-supporting apron means separate from said felling cutterhead and said chipping means and mounted on said vehicle extending between said felling cutterhead and said chipping means for movement thereover of trees felled by said felling cutterhead rearward to said chipping means; and
   a feed rake mounted on said vehicle and movable from above said felling cutterhead toward said chipping means for feeding trees felled by said felling cutterhead along said apron from said felling cutterhead to said chipping means.

3. The land clearing machine defined in claim 2, in which the feed rake includes a shank having a crossbar extending transversely of said shank and pivot means above the apron having its axis extending transversely of the vehicle and supporting a portion of said shank remote from said crossbar with said shank extending forward from said pivot means for swinging of said crossbar downward toward the apron and toward the chipping means.

4. A land clearing machine for felling and chipping trees comprising:
   a vehicle;
   a cylindrical felling cutterhead carried by the forward portion of said vehicle and rotatable about a horizontal axis extending transversely of said vehicle;
   a rotary chipping cutterhead carried by said vehicle at a location spaced a substantial distance rearward from said felling cutterhead and rotatable about a horizontal axis extending transversely of said vehilce; and
   generally horizontal tree-supporting apron means separate from said felling cutterhead and said chipping cutterhead and mounted on said vehicle extending between said cutterheads for movement thereover of trees felled by said felling cutterhead rearward to said chipping cutterhead.

5. The land clearing machine defined in claim 4, and means mounted on the vehicle for feeding trees felled by the felling cutterhead along the apron to the chipping cutterhead.

6. The land clearing machine defined in claim 5, the feeding means being a feed roll above the apron.

7. The land clearing machine defined in claim 6, the feed roll being spined.

8. Th land clearing machine defined in claim 6, the feed roll including screw portions for moving material toward the center of the feed roll.

9. The land clearing machine defined in claim 5, the feeding means being movable elevationally toward and away from the apron.

10. The land clearing machine defined in claim 4, a shank, a chopping bit carried by and projecting laterally from said shank, and pivot means mounted on the vehicle with its axis extending transversely of the vehicle and supporting a portion of said shank remote from said chopping bit with the shank extending forward from said pivot means and guiding said shank for swinging up and down relative to the apron with said chopping bit projecting downward from the underside of said shank.

11. The land clearing machine defined in claim 4, the felling cutterhead rotating such that its leading face moves upward and its upper face moves rearward to kick felled or falling trees upward and rearward onto the apron.

12. The land clearing machine defined in claim 11, the felling cutterhead being adjacent to the ground for kicking slash upward and rearward onto the apron.

13. The land clearing machine defined in claim 12, the felling cutterhead being movable toward and away from the ground.

14. The land clearing machine defined in claim 11, and a feed roll carried by the vehicle above the felling cutterhead and rotating in a direction opposite the direction of rotation of the felling cutterhead.

15. The land clearing machine defined in claim 11, and a feed rake carried by the vehicle above the felling cutterhead and movable toward the chipping cutterhead.

16. The land clearing machine defined in claim 4, and an anvil carried by the vehicle adjacent to and generally rearward of the apron and cooperating with the chipping cutterhead.

17. The land clearing machine defined in claim 4, the chipping cutterhead being generally above the apron.

18. The land clearing machine defined in claim 17, and a dirt discharge opening located generally rearward of the apron and beneath the chipping cutterhead.

19. The land clearing machine defined in claim 4, and means driving the felling and chipping cutterheads for rotation in opposite directions.

20. The land clearing machine defined in claim 4, side cutterheads spaced longitudinally of the chipping cutterhead, and means for rotating said side cutterheads, respectively, about generally upright axes.

21. The land clearing machine defined in claim 20, the side cutterheads being located between the felling cutterhead and the chipping cutterhead.

22. The land clearing machine defined in claim 20, in which the direction of rotation of each side cutterhead is reversible independent of the direction of rotation of the other side cutterhead.

23. The land clearing machine defined in claim 20 or 21, the rotating axes of the side cutterheads being substantially perpendicular to the plane of the apron.

24. The land clearing machine defined in claim 4, and means at a side of the apron for delimbing trees felled by the felling cutterhead.

25. The land clearing machine defined in claim 24, the tree-delimbing means being cutterheads rotatable about upright axes in directions to feed limbs toward the chipping cutterhead.

* * * * *

UNITED STATES PATENT AND TRADEMARK OFFICE
CERTIFICATE OF CORRECTION

PATENT NO. : 4,236,554

DATED : December 2, 1980

INVENTOR(S) : Thomas W. Nicholson

It is certified that error appears in the above-identified patent and that said Letters Patent are hereby corrected as shown below:

Title page, [56] References Cited, cancel "Pallari" and insert ---Pallartri---.

Column 7, line 50, cancel "tree-falling" and insert ---tree-felling---.

Column 8, line 39, cancel "hilce" and insert ---hicle---; line 54, cancel "Th" and insert ---The---.

Signed and Sealed this

Third Day of March 1981

[SEAL]

Attest:

RENE D. TEGTMEYER

*Attesting Officer*     *Acting Commissioner of Patents and Trademarks*